United States Patent
Wang et al.

(10) Patent No.: US 11,871,247 B2
(45) Date of Patent: Jan. 9, 2024

(54) DOWNLINK CONTROL CHANNEL TRANSMISSION AND RECEPTION METHODS, TERMINAL, AND NETWORK SIDE DEVICE

(71) Applicant: DATANG MOBILE COMMUNICATIONS EQUIPMENT CO., LTD., Beijing (CN)

(72) Inventors: Lei Wang, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 457 days.

(21) Appl. No.: 17/280,809

(22) PCT Filed: Sep. 16, 2019

(86) PCT No.: PCT/CN2019/105895
§ 371 (c)(1),
(2) Date: Mar. 26, 2021

(87) PCT Pub. No.: WO2020/063377
PCT Pub. Date: Apr. 2, 2020

(65) Prior Publication Data
US 2022/0038919 A1 Feb. 3, 2022

(30) Foreign Application Priority Data
Sep. 28, 2018 (CN) .......................... 201811143057.1

(51) Int. Cl.
H04W 16/28 (2009.01)
H04W 72/02 (2009.01)
(Continued)

(52) U.S. Cl.
CPC ........... *H04W 16/28* (2013.01); *H04W 24/08* (2013.01); *H04W 72/02* (2013.01); *H04W 72/23* (2023.01)

(58) Field of Classification Search
CPC ..... H04W 16/28; H04W 24/08; H04W 72/02; H04W 72/23; H04W 74/0816; H04W 72/046; H04L 5/0023; H04L 5/0053
See application file for complete search history.

(56) References Cited

U.S. PATENT DOCUMENTS

2019/0306847 A1 10/2019 Seo et al.
2020/0045569 A1* 2/2020 Seo .................. H04L 5/0048

FOREIGN PATENT DOCUMENTS

EP 3490184 A1 5/2019
EP 3657725 A1 5/2020
(Continued)

OTHER PUBLICATIONS

LG Electronics, Remaining issues on downlink control channel, 3GPP TSG RAN WG1 Meeting #94, Gothenburg, Sweden, Aug. 20-24, 2018, R1-1808490 (Year: 2018).*
(Continued)

*Primary Examiner* — Shailendra Kumar
(74) *Attorney, Agent, or Firm* — Ladas & Parry, LLP

(57) ABSTRACT

A downlink control channel transmission method, a terminal and a network side device are provided. The method includes: selecting, in a case that monitoring occasions of search spaces transmitted in different Control Resource Sets (CORESETs) configured with different beam directions collide, a target CORESET from the different CORESETs according to types of the search spaces where the collision occurs, wherein the collision during the monitoring occasions comprises that the monitoring occasions are the same and configured resources of the different CORESETs overlap, or, that a time interval between the monitoring occasions
(Continued)

is less than a specified threshold; and detecting and receiving a downlink control channel according to a beam direction of the target CORESET.

12 Claims, 2 Drawing Sheets

(51) Int. Cl.
*H04W 72/23* (2023.01)
*H04W 24/08* (2009.01)

(56) References Cited

FOREIGN PATENT DOCUMENTS

| JP | 2020-532900 | | 11/2020 | | |
|----|----|----|----|----|----|
| KR | 10-2020-0014252 | | 2/2020 | | |
| WO | 2018016907 | A1 | 1/2018 | | |
| WO | WO-2018016907 | A1 * | 1/2018 | ........... | H04B 7/0417 |
| WO | 2018089262 | A1 | 5/2018 | | |
| WO | 2018143702 | A1 | 8/2018 | | |

OTHER PUBLICATIONS

LG Electronics, Remaining issues on PDCCH structure, 3GPP TSG RAN WG1 Meeting #93, Busan, Korea, May 21-25, 2018, R1-1806615 (Year: 2018).*
First Office action and Search Report from CN app. No. 201811143057.1, dated Apr. 1, 2021, with English translation from Global Dossier, all pages.
"Remaining issues on downlink control channel", R1-1808490, 3GPP TSG RAN WG1 Meeting #94, Gothenburg, Sweden, Aug. 20-24, 2018, all pages.
LG Electronics, "Remaining issues on PDCCH structure", R1-1806615, 3GPP TSG RAN WG1 Meeting #93, Busan, Korea, May 21-25, 2018, all pages.
Extended European Search Report from EP app. No. 19864617.6, dated Oct. 22, 2021, all pages.
Office Action for Korean Application No. 10-2021-7012710 dated May 30, 2022.
Office Action for Japanese Application No. 2021-517609 dated Apr. 19, 2022.
NTT DOCOMO, Inc., "Offline Summary for PDCCH Structure and Search Space," 3GPP TSG RAN WG1 Meeting #94, Gothenburg, Sweden, R1-1809855, NTT DOCOMO, Inc., Aug. 20-24, 2018, entire document.

* cited by examiner

Selecting, in a case that monitoring occasions of Search Spaces (SS) transmitted in different Control Resource Sets (CORESETs) configured with different beam directions collide, a target CORESET from the different CORESETs according to types of the search spaces where the collision occurs, wherein the collision during the monitoring occasions includes that the monitoring occasions are the same and configured resources of the different CORESETs overlap, or, that a time interval between the monitoring occasions is less than a specified threshold — 11

Detecting and receiving a downlink control channel according to a beam direction of the target CORESET — 12

Fig.1

In a case that occasions of transmissions of a downlink control channel that requires to be performed in different CORESETs configured with different beam directions collide, wherein the collision during the occasions of the transmissions of the downlink control channel includes that the occasions of the transmissions of the downlink control channel are the same and configured resources of the different CORESETs overlap, or, that a time interval between the transmissions of the downlink control channel is less than a specified threshold, selecting a target CORESET from the different CORESETs according to types of search spaces in the different CORESETs where the collision occurs, and transmitting the downlink control channel according to the beam direction of the target CORESET; or, transmitting the downlink control channel in the different CORESETs according to respective beam directions of the different CORESETs — 21

Fig.2

DOWNLINK CONTROL CHANNEL TRANSMISSION AND RECEPTION METHODS, TERMINAL, AND NETWORK SIDE DEVICE

CROSS-REFERENCE TO RELATED APPLICATION

This application is the U.S. national phase of PCT Application No. PCT/CN2019/105895 filed on Sep. 16, 2019, which claims a priority to the Chinese patent application No. 201811143057.1 filed in China on Sep. 28, 2018, the disclosures of which are incorporated herein by reference in their entireties.

TECHNICAL FIELD

The present disclosure relates to the field of communications technologies, and in particular, relates to a downlink control channel transmission method, a downlink control channel reception method, a terminal, and a network side device.

BACKGROUND

A concept of a Control-Resource Set (CORESET) is introduced in fifth-generation mobile communication technology (5th-Generation, 5G) systems. Time domain resources of a CORESET include 1 to 3 Orthogonal Frequency Division Multiplexing (OFDM) symbols. In a frequency domain of the CORESET, a bitmap with a length of 45 indicates multiple continuous or discrete resource groups with continuous six Resource Blocks (RB) as a granularity. A resource configuration is very flexible. Search spaces with different monitoring periods are transmitted in the same or different CORESETs. Each CORESET may be configured with a beam direction independently, that is, different CORESETs may be configured with different beam directions (i.e., Type-D Quasi-Co Location (QCL)). In a case that CORESETs configured with different beam directions coincide (or overlap) on configured resources and search spaces belonging to different CORESETs collide at a same Physical Downlink Control Channel (PDCCH) monitoring occasion, a terminal may only receive data in one beam direction, but behavior of a base station and the terminal is not clearly defined currently.

SUMMARY

Embodiments of the present disclosure provide a downlink control channel reception method, a downlink control channel transmission method, a terminal and a network side device, which are used to solve a problem that the behavior of the base station and the terminal is not clearly defined in a case that CORESETs configured with different beam directions overlap in physical resources.

In order to achieve the above purpose, in a first aspect, some embodiments of the present disclosure provide a downlink control channel reception method, and the method is applied to a terminal and includes:

selecting, in a case that monitoring occasions of search spaces transmitted in different Control Resource Sets (CORESETs) configured with different beam directions collide, a target CORESET from the different CORESETs according to types of the search spaces where the collision occurs, wherein the collision during the monitoring occasions comprises that the monitoring occasions are the same and configured resources of the different CORESETs overlap, or, that a time interval between the monitoring occasions is less than a specified threshold; and detecting and receiving a downlink control channel according to a beam direction of the target CORESET.

Optionally, selecting the target CORESET from the different CORESETs according to the types of the search spaces where the collision occurs includes:

determining, in a case that only one of the search spaces where the collision occurs is a common search space, a CORESET for transmitting the common search space as the target CORESET.

Optionally, selecting the target CORESET from the different CORESETs according to the types of the search spaces where the collision occurs includes:

selecting, in a case that at least two of the search spaces where the collision occurs are common search spaces, a CORESET with a lowest index as the target CORESET from at least two CORESETs for transmitting the common search spaces.

Optionally, selecting the target CORESET from the different CORESETs according to the types of the search spaces where the collision occurs includes:

selecting, in a case that the search spaces where the collision occurs are all specific search spaces, a CORESET with a lowest index as the target CORESET from the different CORESETs.

Optionally, detecting and receiving the downlink control channel according to the beam direction of the target CORESET includes:

detecting and receiving the downlink control channel in the different CORESETs according to the beam direction of the target CORESET; or, detecting and receiving the downlink control channel only in the target CORESET according to the beam direction of the target CORESET, and not detecting the downlink control channel in a CORESET other than the target CORESET among the different CORESETs.

In a second aspect, some embodiments of the present disclosure further provide a downlink control channel transmission method, and the method is applied to a network side device and includes:

in a case that occasions of transmissions of a downlink control channel that requires to be performed in different CORESETs configured with different beam directions collide, wherein the collision during the occasions of the transmissions of the downlink control channel comprises: that the occasions of the transmissions of the downlink control channel are the same and configured resources of the different CORESETs overlap, or, that a time interval between the transmissions of the downlink control channel is less than a specified threshold, selecting a target CORESET from the different CORESETs according to types of search spaces in the different CORESETs where the collision occurs, and transmitting the downlink control channel according to a beam direction of the target CORESET; or, transmitting the downlink control channel in the different CORESETs according to respective beam directions of the different CORESETs.

Optionally, selecting the target CORESET from the different CORESETs according to the types of the search spaces in the different CORESETs where the collision occurs includes:

determining, in a case that only one of the search spaces where the collision occurs is a common search space, a CORESET for transmitting the common search space as the target CORESET.

Optionally, selecting the target CORESET from the different CORESETs according to the types of the search spaces in the different CORESETs where the collision occurs includes:

selecting, in a case that at least two of the search spaces where the collision occurs are common search spaces, a CORESET with a lowest index as the target CORESET from at least two CORESETs for transmitting the common search spaces.

Optionally, selecting the target CORESET from the different CORESETs according to the types of the search spaces in the different CORESETs where the collision occurs includes:

selecting, in a case that the search spaces where the collision occurs are all specific search spaces, a CORESET with a lowest index as the target CORESET from the different CORESETs.

Optionally, transmitting the downlink control channel according to the beam direction of the target CORESET includes:

transmitting the downlink control channel in the different CORESETs according to the beam direction of the target CORESET; or, transmitting the downlink control channel only in the target CORESET according to the beam direction of the target CORESET, and not transmitting the downlink control channel in all the other CORESET(s) except the target CORESET among the different CORESETs.

In a third aspect, some embodiments of the present disclosure further provide a terminal, and the terminal includes:

a first target CORESET determination module, configured to select, in a case that monitoring occasions of search spaces transmitted in different Control Resource Sets (CORESETs) configured with different beam directions collide, a target CORESET from the different CORESETs according to types of the search spaces where the collision occurs, wherein the collision during the monitoring occasions comprises that the monitoring occasions are the same and configured resources of the different CORESETs overlap, or, that a time interval between the monitoring occasions is less than a specified threshold; and a detection and reception module, configured to detect and receive a downlink control channel according to a beam direction of the target CORESET.

Optionally, the first target CORESET determination module includes:

a first determination unit, configured to determine, in a case that only one of the search spaces where the collision occurs is a common search space, a CORESET for transmitting the common search space as the target CORESET.

Optionally, the first target CORESET determination module includes:

a second determination unit, configured to select, in a case that at least two of the search spaces where the collision occurs are common search spaces, a CORESET with a lowest index as the target CORESET from at least two CORESETs for transmitting the common search spaces.

Optionally, the first target CORESET determination module includes:

a third determination unit, configured to select, in a case that the search spaces where the collision occurs are all specific search spaces, a CORESET with a lowest index as the target CORESET from the different CORESETs.

Optionally, the detection and reception module includes:

a first detection and reception unit, configured to detect and receive the downlink control channel in the different CORESETs according to the beam direction of the target CORESET; or, a second detection and reception unit, configured to detect and receive the downlink control channel only in the target CORESET according to the beam direction of the target CORESET, and not to detect the downlink control channel in a CORESET other than the target CORESET among the different CORESETs.

In a fourth aspect, some embodiments of the present disclosure further provide a network side device, and the network side device includes:

a transmission module, configured to, in a case that occasions of transmissions of a downlink control channel that requires to be performed in different CORESETs configured with different beam directions collide, select a target CORESET from the different CORESETs according to types of search spaces in the different CORESETs where the collision occurs, and transmit the downlink control channel according to the beam direction of the target CORESET; or, transmit the downlink control channel in the different CORESETs according to respective beam directions of the different CORESETs;

wherein the collision during the occasions of the transmissions of the downlink control channel comprises: that the occasions of the transmissions of the downlink control channel are the same and configured resources of the different CORESETs overlap, or, that a time interval between the transmissions of the downlink control channel is less than a specified threshold.

Optionally, the transmission module includes:

a fourth determination unit, configured to determine, in a case that only one of the search spaces where the collision occurs is a common search space, a CORESET for transmitting the common search space as the target CORESET.

Optionally, the transmission module includes:

a fifth determination unit, configured to select, in a case that at least two of the search spaces where the collision occurs are common search spaces, a CORESET with a lowest index as the target CORESET from at least two CORESETs for transmitting the common search spaces.

Optionally, the transmission module includes:

a sixth determination unit, configured to select, in a case that the search spaces where the collision occurs are all specific search spaces, a CORESET with a lowest index as the target CORESET from the different CORESETs.

Optionally, the transmission module includes:

a first transmission unit, configured to transmit the downlink control channel in the different CORESETs according to the beam direction of the target CORESET; or a second transmission unit, configured to transmit the downlink control channel only in the target CORESET according to the beam direction of the target CORESET, and not to transmit the downlink control channel in a CORESET other than the target CORESET among the different CORESETs.

In a fifth aspect, some embodiments of the present disclosure further provide a terminal, and the terminal includes: a transceiver, a storage, a processor and a computer program stored in the storage and executable by the processor.

The processor is configured to select, in a case that monitoring occasions of search spaces transmitted in different Control Resource Sets (CORESETs) configured with different beam directions collide, a target CORESET from the different CORESETs according to types of the search spaces where the collision occurs, wherein the collision during the monitoring occasions comprises that the monitoring occasions are the same and configured resources of the different CORESETs overlap, or, that a time interval between the monitoring occasions is less than a specified threshold.

The transceiver is configured to detect and receive a downlink control channel according to a beam direction of the target CORESET.

Optionally, the processor is configured to determine, in a case that only one of the search spaces where the collision occurs is a common search space, a CORESET for transmitting the common search space as the target CORESET.

Optionally, the processor is configured to select, in a case that at least two of the search spaces where the collision occurs are common search spaces, a CORESET with a lowest index as the target CORESET from at least two CORESETs for transmitting the common search spaces.

Optionally, the processor is configured to select, in a case that the search spaces where the collision occurs are all specific search spaces, a CORESET with a lowest index as the target CORESET from the different CORESETs.

Optionally, the transceiver is configured to detect and receive the downlink control channel in the different CORESETs according to the beam direction of the target CORESET; or, to detect and receive the downlink control channel only in the target CORESET according to the beam direction of the target CORESET, and not to detect the downlink control channel in a CORESET other than the target CORESET among the different CORESETs.

In a sixth aspect, some embodiments of the present disclosure further provide a network side device including a transceiver, a storage, a processor and a computer program stored in the storage and executable by the processor.

The processor is configured to, in a case that occasions of a downlink control channel to be transmitted in different Control Resource Sets (CORESETs) configured with different beam directions collide, select a target CORESET from the different CORESETs according to types of search spaces in the different CORESETs where the collision occurs; the transceiver is configured to transmit the downlink control channel according to the beam direction of the target CORESET; or, the transceiver is configured to transmit the downlink control channel in the different CORESETs according to respective beam directions of the different CORESETs.

The collision during the occasions of transmissions of the downlink control channel means that the occasions of transmissions of the downlink control channel are the same and configured resources of the different CORESETs overlap, or, that a time interval between transmitting the downlink control channel is less than a specified threshold.

Optionally, the processor is configured to determine, in a case that only one of the search spaces where the collision occurs is a common search space, a CORESET for transmitting the common search space as the target CORESET.

Optionally, the processor is configured to select, in a case that at least two of the search spaces where the collision occurs are common search spaces, a CORESET with a lowest index as the target CORESET from at least two CORESETs for transmitting the common search spaces.

Optionally, the processor is configured to select, in a case that the search spaces where the collision occurs are all specific search spaces, a CORESET with a lowest index as the target CORESET from the different CORESETs.

Optionally, the transceiver is configured to transmit the downlink control channel in the different CORESETs according to the beam direction of the target CORESET; or, transmit the downlink control channel only in the target CORESET according to the beam direction of the target CORESET, and not transmitting the downlink control channel in a CORESET other than the target CORESET among the different CORESETs.

In a seventh aspect, some embodiments of the present disclosure further provide a computer readable storage medium, storing therein a computer program. The computer program is executed by a processor to implement steps in any of the downlink control channel transmission method and the downlink control channel reception method.

Beneficial effects of the technical schemes of the embodiments of the present disclosure are as follows.

In some embodiments of the present disclosure, in a case that monitoring occasions of search spaces transmitted in different CORESETs configured with different beam directions collide, a target CORESET is selected from the different CORESETs according to types of the search spaces where the collision occurs, and a downlink control channel is detected and received according to a beam direction of the target CORESET, the collision during the monitoring occasions means that the monitoring occasions are the same and configured resources of the different CORESETs overlap, or, that a time interval between the monitoring occasions is less than a specified threshold. As a result, in a case that different CORESETs configured with different beam directions collide on physical resources (that is, the configured resources overlap and the downlink control channel needs to be detected at the same occasion, or, the downlink control channel needs to be detected at adjacent occasions with a small interval), behaviors of the base station and the terminal are clearly defined, which in turn ensures that the downlink control channel can be successfully received.

BRIEF DESCRIPTION OF THE DRAWINGS

FIG. 1 is a schematic flowchart of a downlink control channel reception method applied to a terminal according to some embodiments of the present disclosure;

FIG. 2 is a schematic flowchart of a downlink control channel transmission method applied to a base station according to some embodiments of the present disclosure;

DETAILED DESCRIPTION

Figure 3:
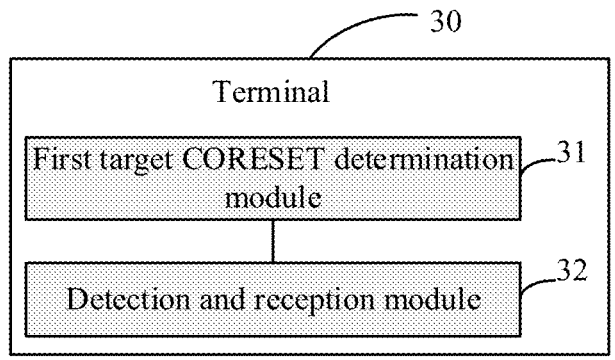
FIG. 3 is a schematic structural diagram of a terminal according to some embodiments of the present disclosure.

In order to make the objectives, technical solutions and advantages of the present disclosure clearer, the technical solutions of the present disclosure will be clearly and completely described below with reference to the drawings of the present disclosure. Apparently, the described embodiments are some embodiments of the present disclosure, but are not all the embodiments. Based on the embodiments of the present disclosure, all other embodiments derived by a person of ordinary skill in the art without creative effort shall fall within the scope of the present disclosure.

Referring to FIG. 1, FIG. 1 is a schematic flowchart of a downlink control channel reception method provided in some embodiments of the present disclosure, and the method is applied to a terminal and includes Step 11 and Step 12.

Step 11: selecting, in a case that monitoring occasions of Search Spaces (SS) transmitted in different Control Resource Sets (CORESETs) configured with different beam directions collide, a target CORESET from the different CORESETs according to types of the search spaces where the collision occurs, wherein the collision during the monitoring occasions includes that the monitoring occasions are the same and configured resources of the different CORESETs overlap, or, that a time interval between the monitoring occasions is less than a specified threshold.

Step 12: detecting and receiving a downlink control channel according to a beam direction of the target CORESET.

In the downlink control channel reception method provided in some embodiments of the present disclosure, in a case that monitoring occasions of search spaces transmitted in different CORESETs configured with different beam directions collide, a target CORESET is selected from the different CORESETs according to types of the search spaces where the collision occurs, and a downlink control channel is detected and received according to a beam direction of the target CORESET, the collision during the monitoring occasions means that the monitoring occasions are the same and configured resources of the different CORESETs overlap, or, that a time interval between the monitoring occasions is less than a specified threshold. As a result, in a case that different CORESETs configured with different beam directions collide on physical resources (that is, the configured resources overlap and the downlink control channel needs to be detected at the same occasion, or the downlink control channel needs to be detected at adjacent occasions with a small interval), behavior of the terminal is clearly defined, which in turn ensures that the downlink control channel may be successfully received.

The following examples illustrate the above-mentioned downlink control channel reception method.

As one of optional specific implementations, selecting the target CORESET from the different CORESETs according to the types of the search spaces where the collision occurs (i.e. Step 11) includes:
    determining, in a case that only one of the search spaces where the collision occurs is a Common Search Space (CS S), a CORESET for transmitting the common search space as the target CORESET.

In some embodiments of the present disclosure, in a case that the terminal monitors multiple search spaces transmitted in different CORESETs at the same monitoring occasion or two monitoring occasions whose time interval is less than the specified threshold, the terminal preferentially receives the common search space. That is, a CORESET corresponding to the common search space in the search spaces where the collision occurs is determined as the target CORESET, and the downlink control channel is detected and received according to the beam direction of the target CORESET.

In an embodiment, selecting the target CORESET from the different CORESETs according to the types of the search spaces where the collision occurs (i.e., Step 11) includes:
    selecting, in a case that at least two of the search spaces where the collision occurs are common search spaces, a CORESET with a lowest index as the target CORESET from at least two CORESETs for transmitting the common search spaces.

In an embodiment, selecting the target CORESET from the different CORESETs according to the types of the search spaces where the collision occurs (i.e. Step 11) includes:
    selecting, in a case that the search spaces where the collision occurs are all specific search spaces (UE-specific search space, US S), a CORESET with a lowest index as the target CORESET from the different CORESETs.

In addition, detecting and receiving the downlink control channel according to the beam direction of the target CORESET (i.e., Step 12) includes:
    detecting and receiving the downlink control channel in the different CORESETs according to the beam direction of the target CORESET; or,
    detecting and receiving the downlink control channel only in the target CORESET according to the beam direction of the target CORESET, and not detecting the downlink control channel in a CORESET other than the target CORESET among the different CORESETs.

In a case that the CORESETs configured with different beam directions collides on physical resources (that is, the configured resources overlap and monitoring occasions of the search spaces are the same, or the interval between the motoring occasions is too small), the behavior of the terminal is defined clearly through the above steps in some embodiments of the present disclosure.

Referring to FIG. 2, FIG. 2 is a schematic flowchart of a downlink control channel transmission method provided in some embodiments of the present disclosure, and the method is applied to a network side device and includes Step 21.

Step 21: in a case that occasions of transmissions of a downlink control channel that requires to be performed in different CORESETs configured with different beam directions collide, wherein the collision during the occasions of the transmissions of the downlink control channel includes that the occasions of the transmissions of the downlink control channel are the same and configured resources of the different CORESETs overlap, or, that a time interval between the transmissions of the downlink control channel is less than a specified threshold,
    selecting a target CORESET from the different CORESETs according to types of search spaces in the different CORESETs where the collision occurs, and transmitting the downlink control channel according to the beam direction of the target CORESET; or, transmitting the downlink control channel in the different CORESETs according to respective beam directions of the different CORESETs.

In some embodiments of the present disclosure, in a case that occasions of a downlink control channel to be transmitted in different CORESETs configured with different beam directions collide, a target CORESET is selected from the different CORESETs according to types of search spaces in the different CORESETs where the collision occurs, and the downlink control channel is transmitted according to the beam direction of the target CORESET; or, the downlink control channel is transmitted in the different CORESETs according to respective beam directions of the different CORESETs. The collision during the occasions of the transmissions of the downlink control channel means that the occasions of the transmissions of the downlink control channel are the same and the different CORESETs overlap on configured resources, or, that a time interval is less than a specified threshold. As a result, in a case that different CORESETs configured with different beam directions collide on physical resources (that is, the configured resources overlap and the downlink control channel needs to be transmitted at the same occasion, or the downlink control channel needs to be transmitted at adjacent occasions with a small interval), behavior of the base station is clearly defined, which in turn ensures that the downlink control channel may be successfully sent.

The network side device may be a base station.

The following examples illustrate the above-mentioned downlink control channel transmission method.

In one of embodiments, selecting the target CORESET from the different CORESETs according to the types of search spaces in the different CORESETs where the collision occurs (i.e. Step 21) includes:

determining, in a case that only one of the search spaces where the collision occurs is a common search space, a CORESET for transmitting the common search space as the target CORESET.

In some embodiments of the present disclosure, in a case that the different CORESETs with different beam directions are configured, and the downlink control channel needs to be transmitted at the same occasion (the configured resources of the different CORESETs overlap) or two adjacent occasions whose time interval is less than the specified threshold, the base station preferentially transmits the common search space. That is, a CORESET corresponding to the common search space in the search spaces where the collision occurs is determined as the target CORESET, and the downlink control channel is transmitted according to the beam direction of the target CORESET.

In an embodiment, selecting the target CORESET from the different CORESETs according to the types of the search spaces in the different CORESETs where the collision occurs (i.e. Step 21) includes:

selecting, in a case that at least two of the search spaces where the collision occurs are common search spaces, a CORESET with a lowest index as the target CORESET from at least two CORESETs for transmitting the common search spaces.

In an embodiment, selecting the target CORESET from the different CORESETs according to the types of the search spaces in the different CORESETs where the collision occurs (i.e. Step 21) includes:

selecting, in a case that the search spaces where the collision occurs are all specific search spaces, a CORESET with a lowest index as the target CORESET from the different CORESETs.

In the embodiment, transmitting the downlink control channel according to the beam direction of the target CORESET (i.e., Step 21) includes:

transmitting the downlink control channel in the different CORESETs according to the beam direction of the target CORESET; or transmitting the downlink control channel only in the target CORESET according to the beam direction of the target CORESET, and not transmitting the downlink control channel in every other CORESET(s) except the target CORESET among the different CORESETs.

In a case that the CORESETs configured with different beam directions collides on physical resources (that is, the configured resources overlap and the occasions of transmissions of the downlink control channel are the same, or the time interval between transmissions of the downlink control channel is quite small), the behavior of the base station is defined clearly through the above steps in some embodiments of the present disclosure.

Some embodiments of the present disclosure provide a downlink control channel transmission method, and the method is specifically as follows.

It is assumed that the base station configures two CORESETs for the terminal (such as UE1), namely CORESET #1 and CORESET #2, and configures different beam directions, for example, the CORESET #1 corresponds to a beam direction beam #1, and the CORESET #2 corresponds to a beam direction beam #2. That is, downlink control channels transmitted in the CORESET #1 are all transmitted in the beam #1, and downlink control channels transmitted in the CORESET #2 are all transmitted in the beam #2. It is assumed that three search spaces {USS #3, USS #4, USS #5} are configured on the CORESET #1, and two search spaces {CSS #1, USS #2} are configured on the CORESET #2. It is assumed that a monitoring occasion of the CSS #1 transmitted on the CORESET #2 and a monitoring occasion of the USS #3 transmitted on the CORESET #1 collide in a slot N (a slot numbered N) (the monitoring occasions are the same), and the CORESET #1 and the CORESET #2 overlap in configured resources. Then the base station (also called the network side) and the terminal (also called the terminal side) determine how to transmit and receive the downlink control channel at the monitoring occasion according to the following rules.

The terminal detects and receives the downlink control channel according to the beam direction (the beam #2) of the CORESET #2 on which the CSS #1 is transmitted. The terminal detects and receives the downlink control channel in the CORESET #1 according to the beam #2; or, the terminal does not monitor (detect) the downlink control channel in the CORESET #1. The base station transmits the downlink control channel according to the beam direction (the beam #2) of the CORESET #2 on which the CSS #1 is transmitted. The base station transmits the downlink control channel in the CORESET #1 according to the beam #2; or, the base station does not transmit the downlink control channel in the CORESET #1.

Some embodiments of the present disclosure provide a downlink control channel transmission method, and the method is specifically as follows.

It is assumed that the base station configures two CORESETs for the terminal (such as UE1), namely CORESET #1 and CORESET #2, and configures different beam directions, respectively, for example, the CORESET #1 corresponds to a beam direction beam #1, and the CORESET #2 corresponds to a beam direction beam #2. That is, downlink control channels transmitted in the CORESET #1 are all transmitted in beam #1, and downlink control channels transmitted in the CORESET #2 are all transmitted in the beam #2. It is assumed that three search spaces {CSS #3, CSS #4, CSS #5} are configured on the CORESET #1, and two search spaces {CSS #1, USS #2} are configured on the CORESET #2. It is assumed that a monitoring occasion of the CSS #1 transmitted on the CORESET #2 and a monitoring occasion of the CSS #3 transmitted on the CORESET #1 collide in a slot N (the monitoring occasions are the same), and the CORESET #1 and the CORESET #2 overlap in configured resources. Then the base station and the terminal determine how to transmit and receive the downlink control channel at the monitoring occasion according to the following rules.

The terminal detects and receives the downlink control channel according to the beam direction (the beam #1) of the CORESET #1 (with a lowest index). The terminal detects and receives the downlink control channel in the CORESET #2 according to the beam #1; or, the terminal does not monitor (detect) the downlink control channel in the CORESET #2. The base station transmits the downlink control channel according to the beam direction (the beam #1) of the CORESET #1. The base station transmits the downlink control channel in the CORESET #2 according to the beam #1; or, the base station does not transmit the downlink control channel in the CORESET #2.

Some embodiments of the present disclosure provide a downlink control channel transmission method, and the method is specifically as follows.

It is assumed that the base station configures two CORESETs for the terminal (such as UE1), namely CORESET #1 and CORESET #2, and configures different beam directions, respectively, for example, the CORESET #1 corresponds to a beam direction beam #1, and the CORESET #2 corresponds to a beam direction beam #2. That is, downlink control channels transmitted in the CORESET #1 are all transmitted in beam #1, and downlink control channels transmitted in the CORESET #2 are all transmitted in the beam #2. It is assumed that three search spaces {CSS #3, CSS #4, CSS #5} are configured on the CORESET #1, and two search spaces {CSS #1, USS #2} are configured on the CORESET #2. It is assumed that a monitoring occasion of the USS #2 transmitted on the CORESET #2 and a monitoring occasion of the USS #4 transmitted on the CORESET #1 collide in a slot N (the monitoring occasions are the same), and the CORESET #1 and the CORESET #2 overlap in configured resources. Then the base station and the terminal determine how to transmit and receive the downlink control channel at the monitoring occasion according to the following rules.

The terminal detects and receives the downlink control channel according to the beam direction (the beam #1) of the CORESET #1 (with a lowest index). The terminal detects and receives the downlink control channel in the CORESET #2 according to the beam #1; or, the terminal does not monitor (detect) the downlink control channel in the CORESET #2. The base station transmits the downlink control channel according to the beam direction (the beam #1) of the CORESET #1. The base station transmits the downlink control channel in the CORESET #2 according to the beam #1; or, the base station does not transmit the downlink control channel in the CORESET #2.

Some embodiments of the present disclosure provide a downlink control channel transmission method, and the method is specifically as follows.

It is assumed that the base station configures two CORESETs for the terminal (such as UE1), namely CORESET #1 and CORESET #2, and configures different beam directions, respectively, for example, the CORESET #1 corresponds to a beam direction beam #1, and the CORESET #2 corresponds to a beam direction beam #2. That is, downlink control channels transmitted in the CORESET #1 are all transmitted in beam #1, and downlink control channels transmitted in the CORESET #2 are all transmitted in the beam #2. It is assumed that three search spaces {USS #3, USS #4, USS #5} are configured on the CORESET #1, and two search spaces {CSS #1, USS #2} are configured on the CORESET #2. It is assumed that a time interval between a monitoring occasion #1 of the CSS #1 transmitted on the CORESET #2 and a monitoring occasion #2 of the USS #3 transmitted on the CORESET #1 is less than a threshold T, then the base station and the terminal determine how to transmit and receive the downlink control channel at the monitoring occasions (including the monitoring occasion #1 and the monitoring occasion #2) according to the following rules.

The terminal detects and receives the downlink control channel according to the beam direction (the beam #2) of the CORESET #2 where the CSS #1 is transmitted. The terminal detects and receives the downlink control channel in the CORESET #1 according to the beam #2; or, the terminal does not monitor (detect) the downlink control channel in the CORESET #1. The base station transmits the downlink control channel according to the beam direction (the beam #2) of the CORESET #2 where the CSS #1 is transmitted. The base station transmits the downlink control channel in the CORESET #1 according to the beam #2; or, the base station does not transmit the downlink control channel in the CORESET #1.

Some embodiments of the present disclosure provide a downlink control channel transmission method, and the method is specifically as follows.

It is assumed that the base station configures two CORESETs for the terminal (such as UE1), namely CORESET #1 and CORESET #2, and configures different beam directions, for example, the CORESET #1 corresponds to a beam direction beam #1, and the CORESET #2 corresponds to a beam direction beam #2. That is, downlink control channels transmitted in the CORESET #1 are all transmitted in beam #1, and downlink control channels transmitted in the CORESET #2 are all transmitted in the beam #2. It is assumed that three search spaces {CSS #3, CSS #4, CSS #5} are configured on the CORESET #1, and two search spaces {CSS #1, USS #2} are configured on the CORESET #2. It is assumed that a time interval between a monitoring occasion #1 of the CSS #1 transmitted on the CORESET #2 and a monitoring occasion #2 of the CSS #3 transmitted on the CORESET #1 is less than a threshold T. Then the network side and the terminal side determine how to transmit and receive the downlink control channel at the monitoring occasions (including the monitoring occasion #1 and the monitoring occasion #2) according to the following rules.

The terminal detects and receives the downlink control channel according to the beam direction (the beam #1) of the CORESET #1 (with a lowest index). The terminal detects and receives the downlink control channel in the CORESET #2 according to the beam #1; or, the terminal does not monitor (detect) the downlink control channel in the CORESET #2. The base station transmits the downlink control channel according to the beam direction (the beam #1) of the CORESET #1. The base station transmits the downlink control channel in the CORESET #2 according to the beam #1; or, the base station does not transmit the downlink control channel in the CORESET #2.

Some embodiments of the present disclosure provide a downlink control channel transmission method, and the method is specifically as follows.

It is assumed that the base station configures two CORESETs for the terminal (such as UE1), namely CORESET #1 and CORESET #2, and configures different beam directions, for example, the CORESET #1 corresponds to a beam direction beam #1, and the CORESET #2 corresponds to a beam direction beam #2. That is, downlink control channels transmitted in the CORESET #1 are all transmitted in beam #1, and downlink control channels transmitted in the CORE- SET #2 are all transmitted in the beam #2. It is assumed that three search spaces {CSS #3, CSS #4, CSS #5} are configured on the CORESET #1, and two search spaces {CSS #1, USS #2} are configured on the CORESET #2. It is assumed that a time interval between a monitoring occasion #1 of the USS #2 transmitted on the CORESET #2 and a monitoring occasion #2 of the USS #4 transmitted on the CORESET #1 is less than a threshold T. Then the network side and the terminal side determine how to transmit and receive the downlink control channel at the monitoring occasions (including the monitoring occasion #1 and the monitoring occasion #2) according to the following rules.

The terminal detects and receives the downlink control channel according to the beam direction (the beam #1) of the CORESET #1 (with a lowest index). The terminal detects and receives the downlink control channel in the CORESET #2 according to the beam #1; or, the terminal does not monitor (detect) the downlink control channel in the CORESET #2. The base station transmits the downlink control channel according to the beam direction (the beam #1) of the CORESET #1. The base station transmits the downlink control channel in the CORESET #2 according to the beam #1; or, the base station does not transmit the downlink control channel in the CORESET #2.

Referring to FIG. 3, FIG. 3 is a schematic structural diagram of a terminal provided in some embodiments of the present disclosure. The terminal 30 includes:
- a first target CORESET determination module 31, configured to select, in a case that monitoring occasions of search spaces transmitted in different Control Resource Sets (CORESETs) configured with different beam directions collide, a target CORESET from the different CORESETs according to types of the search spaces where the collision occurs, wherein the collision during the monitoring occasions comprises that the monitoring occasions are the same and configured resources of the different CORESETs overlap, or, that a time interval between the monitoring occasions is less than a specified threshold; and
- a detection and reception module 32, configured to detect and receive a downlink control channel according to a beam direction of the target CORESET.

In some embodiments of the present disclosure, in a case that a collision occurs at monitoring occasions of search spaces transmitted in different CORESETs configured with different beam directions, a target CORESET is selected from the different CORESETs according to types of the search spaces where the collision occurs, and a downlink control channel is detected and received according to a beam direction of the target CORESET, the collision during the monitoring occasions means that the monitoring occasions are the same and configured resources of the different CORESETs overlap, or, that a time interval between the monitoring occasions is less than a specified threshold. As a result, in a case that different CORESETs configured with different beam directions collide on physical resources (that is, the configured resources overlap and the downlink control channel needs to be detected at the same occasion, or the downlink control channel needs to be detected at adjacent occasions with a small interval), behavior of the terminal is clearly defined, which in turn ensures that the downlink control channel may be successfully received.

Optionally, the first target CORESET determination module 31 includes:
- a first determination unit, configured to determine, in a case that only one of the search spaces where the collision occurs is a common search space, a CORESET for transmitting the common search space as the target CORESET.

Optionally, the first target CORESET determination module 31 includes:
- a second determination unit, configured to select, in a case that at least two of the search spaces where the collision occurs are common search spaces, a CORESET with a lowest index as the target CORESET from at least two CORESETs for transmitting the common search spaces.

Optionally, the first target CORESET determination module 31 includes:
- a third determination unit, configured to select, in a case that the search spaces where the collision occurs are all specific search spaces, a CORESET with a lowest index as the target CORESET from the different CORESETs.

Optionally, the detection and reception module 32 includes:
- a first detection and reception unit, configured to detect and receive the downlink control channel in the different CORESETs according to the beam direction of the target CORESET; or,
- a second detection and reception unit, configured to detect and receive the downlink control channel only in the target CORESET according to the beam direction of the target CORESET, and not to detect the downlink control channel in a CORESET other than the target CORESET among the different CORESETs.

Some embodiments of the present disclosure are product embodiments corresponding to the above-mentioned method embodiment shown in FIG. 1, which will not be repeated herein. The above-mentioned embodiment shown in FIG. 1 may be referred to in details.

Figure 4:
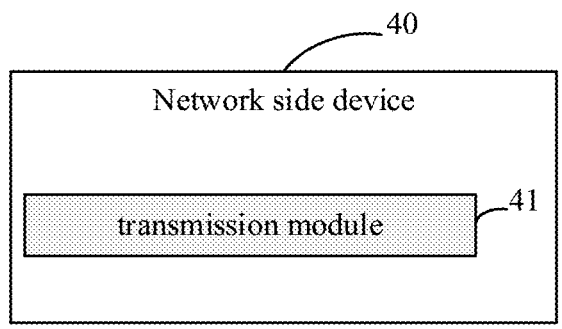
FIG. 4 is a schematic structural diagram of a network side device according to some embodiments of the present disclosure.

Referring to FIG. 4, FIG. 4 is a schematic structural diagram of a network side device provided in some embodiments of the present disclosure. The network side device 40 includes:
- a transmission module 41, configured to, in a case that occasions of transmissions of a downlink control channel that requires to be performed in different CORESETs configured with different beam directions collide, select a target CORESET from the different CORESETs according to types of search spaces in the different CORESETs where the collision occurs, and transmit the downlink control channel according to the beam direction of the target CORESET; or, transmit the downlink control channel in the different CORESETs according to respective beam directions of the different CORESETs;

The collision during the occasions of the transmissions of the downlink control channel comprises: that the occasions of the transmissions of the downlink control channel are the same and configured resources of the different CORESETs overlap, or, that a time interval between the transmissions of the downlink control channel is less than a specified threshold.

In some embodiments of the present disclosure, in a case that a collision occurs at occasions of transmissions of a downlink control channel that needs to be performed in different CORESETs configured with different beam directions, a target CORESET is selected from the different CORESETs according to types of search spaces in the different CORESETs where the collision occurs, and the downlink control channel is transmitted according to the beam direction of the target CORESET; or, the downlink control channel is transmitted in the different CORESETs according to respective beam directions of the different CORESETs. The collision during the occasions of transmissions of the downlink control channel means that the occasions of transmissions of the downlink control channel are the same and the different CORESETs overlap in configured resources, or, that a time interval is less than a specified threshold. As a result, in a case that different CORESETs configured with different beam directions collide on physical resources (that is, the configured resources overlap and the downlink control channel needs to be transmitted at the same occasion, or the downlink control channel needs to be transmitted at adjacent occasions with a small interval), behavior of the base station is clearly defined, which in turn ensures that the downlink control channel may be successfully sent.

Optionally, the transmission module 41 includes:
a fourth determination unit, configured to determine, in a case that only one of the search spaces where the collision occurs is a common search space, a CORESET for transmitting the common search space as the target CORESET.

Optionally, the transmission module 41 includes:
a fifth determination unit, configured to select, in a case that at least two of the search spaces where the collision occurs are common search spaces, a CORESET with a lowest index as the target CORESET from at least two CORESETs for transmitting the common search spaces.

Optionally, the transmission module 41 includes:
a sixth determination unit, configured to select, in a case that the search spaces where the collision occurs are all specific search spaces, a CORESET with a lowest index as the target CORESET from the different CORESETs.

Optionally, the transmission module 41 includes:
a first transmission unit, configured to transmit the downlink control channel in the different CORESETs according to the beam direction of the target CORESET; or
a second transmission unit, configured to transmit the downlink control channel only in the target CORESET according to the beam direction of the target CORESET, and not transmitting the downlink control channel in a CORESET other than the target CORESET among the different CORESETs.

Some embodiments of the present disclosure are product embodiments corresponding to the above-mentioned method embodiments shown in FIG. 2, which will not be repeated herein. The above-mentioned embodiment shown in FIG. 2 may be referred to in details.

Figure 5:
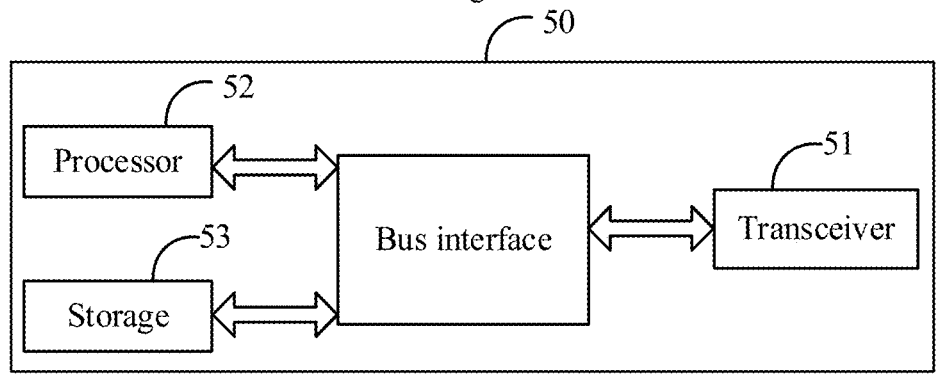
FIG. 5 is a schematic structural diagram of a terminal according to some embodiments of the present disclosure.

Referring to FIG. 5, FIG. 5 is a structural diagram of a terminal provided in some embodiments of the present disclosure. The terminal 50 includes: a transceiver 51, a processor 52, a storage 53, and a computer program stored in the storage 53 and executable by the processor 52.

The processor 52 is configured to select, in a case that monitoring occasions of search spaces transmitted in different Control Resource Sets (CORESETs) configured with different beam directions collide, a target CORESET from the different CORESETs according to types of the search spaces where the collision occurs, wherein the collision during the monitoring occasions comprises that the monitoring occasions are the same and configured resources of the different CORESETs overlap, or, that a time interval between the monitoring occasions is less than a specified threshold.

The transceiver 51 is configured to detect and receive a downlink control channel according to a beam direction of the target CORESET.

The transceiver 51 may be used to receive and transmit data under control of the processor 52.

In FIG. 5, a bus architecture may include any number of interconnected buses and bridges. Various circuits, specifically, one or more processors represented by the processor 52 and a storage represented by the storage 53, are linked together. The bus architecture may also link various other circuits such as peripherals, voltage regulators and power management circuits, which are well known in the art, and therefore a further description is omitted herein. The bus interface provides interfaces. The transceiver 51 may be a plurality of elements, that is, includes a transmitter and a receiver, to provide units configured to communicate with various other devices over a transmission medium.

The processor 52 is responsible for managing the bus architecture and general processing, and the storage 53 may store data used by the processor 52 when performing operations.

Notably, it is not limited that the storage 53 is in a terminal, and the storage 53 and the processor 52 may be separated in different geographical locations.

Optionally, the processor 52 is configured to determine, in a case that only one of the search spaces where the collision occurs is a common search space, a CORESET for transmitting the common search space as the target CORESET.

Optionally, the processor 52 is configured to select, in a case that at least two of the search spaces where the collision occurs are common search spaces, a CORESET with a lowest index as the target CORESET from at least two CORESETs for transmitting the common search spaces.

Optionally, the processor 52 is configured to select, in a case that the search spaces where the collision occurs are all specific search spaces, a CORESET with a lowest index as the target CORESET from the different CORESETs.

Optionally, the transceiver 51 is configured to detect and receive the downlink control channel in the different CORESETs according to the beam direction of the target CORESET; or, to detect and receive the downlink control channel only in the target CORESET according to the beam direction of the target CORESET, and not to detect the downlink control channel in a CORESET other than the target CORESET among the different CORESETs.

The specific working process in some embodiments of the present disclosure is the same as that in the method embodiments shown in FIG. 1, which will not be repeated herein. The description of the method steps in the embodiments shown in FIG. 1 may be referred to in details.

Figure 6:
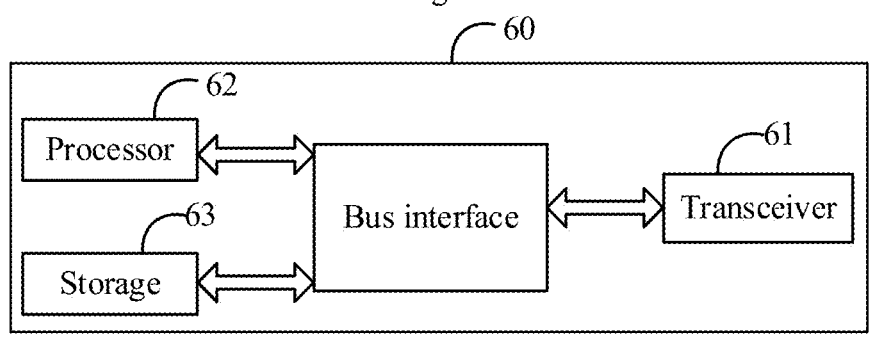
FIG. 6 is a schematic structural diagram of a network side device according to some embodiments of the present disclosure.

Referring to FIG. 6, FIG. 6 is a structural schematic diagram of a network side device provided in some embodiments of the present disclosure. The network side device 60 includes a transceiver 61, a processor 62, a storage 63, and a computer program stored in the storage 63 and executable by the processor 62.

The processor 62 is configured to, in a case that occasions of transmissions of a downlink control channel that requires to be performed in different CORESETs configured with different beam directions collide, select a target CORESET from the different CORESETs according to types of search spaces in the different CORESETs where the collision occurs; the transceiver is configured to transmit the downlink control channel according to the beam direction of the target CORESET; or, the transceiver 61 is configured to transmit the downlink control channel in the different CORESETs according to respective beam directions of the different CORESETs.

The collision during the occasions of the transmissions of the downlink control channel comprises: that the occasions of the transmissions of the downlink control channel are the same and configured resources of the different CORESETs overlap, or, that a time interval between the transmissions of the downlink control channel is less than a specified threshold.

The transceiver 61 may be used to receive and transmit data under control of the processor 62.

In FIG. 6, a bus architecture may include any number of interconnected buses and bridges. Various circuits, specifically, one or more processors represented by the processor 62 and a storage represented by the storage 63, are linked together. The bus architecture may also link various other circuits such as peripherals, voltage regulators and power management circuits, which are well known in the art, and therefore a further description is omitted herein. The bus interface provides interfaces. The transceiver 61 may be a plurality of elements, that is, includes a transmitter and a receiver, to provide units configured to communicate with various other devices over a transmission medium.

The processor 62 is responsible for managing the bus architecture and general processing, and the storage 63 may store data used by the processor 900 when performing operations.

It should be noted that the storage 63 is not limited to a network-side device, and the storage 63 and the processor 62 may be separated in different geographical locations in the further.

Optionally, the processor 62 is configured to determine, in a case that only one of the search spaces where the collision occurs is a common search space, a CORESET for transmitting the common search space as the target CORESET.

Optionally, the processor 62 is configured to select, in a case that at least two of the search spaces where the collision occurs are common search spaces, a CORESET with a lowest index as the target CORESET from at least two CORESETs for transmitting the common search spaces.

Optionally, the processor 62 is configured to select, in a case that the search spaces where the collision occurs are all specific search spaces, a CORESET with a lowest index as the target CORESET from the different CORESETs.

Optionally, the transceiver 61 is configured to transmit the downlink control channel in the different CORESETs according to the beam direction of the target CORESET; or, transmit the downlink control channel only in the target CORESET according to the beam direction of the target CORESET, and not transmitting the downlink control channel in a CORESET other than the target CORESET among the different CORESETs.

The specific working process in some embodiments of the present disclosure is the same as that in the method embodiments shown in FIG. 2, which will not be repeated herein. The description of the method steps in the embodiments shown in FIG. 2 may be referred to in details.

Some embodiments of the present disclosure provide a computer readable storage medium storing therein a computer program, the computer program is executed by a processor, and steps in any of the downlink control channel transmission method and the downlink control channel reception method are implemented. The description of the method steps in the corresponding embodiments above may be referred to in details.

In some embodiments provided in the present application, it should be noted that, the disclosed method and device may be implemented in other means. For example, the device embodiments described above are merely illustrative. For example, a division of modules and units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

In addition, each functional unit in various embodiments of the present disclosure may be integrated into one processing unit, or each unit may exist physically separately, or two or more units may be integrated into one unit. The integrated unit may be implemented in a form of hardware, or may also be implemented in a form of hardware plus a software functional unit.

The above integrated unit implemented in the form of software functional units may be stored in a computer readable storage medium. The above software functional unit is stored in a storage medium and includes several instructions for causing a computer device (which may be a personal computer, a server, or a network device, etc.) to perform some steps of the downlink control channel transmission method and the downlink control channel reception method described in various embodiments of the present disclosure. The foregoing storage medium includes various media that may store program codes, such as a USB flash drive, a mobile hard disk, a Read-Only Memory (ROM for short), a Random Access Memory (RAM for short), a magnetic disk, or an optical disk.

It is to be understood that the embodiments described in embodiments of the present disclosure can be implemented in hardware, software, firmware, middleware, microcode, or any combination thereof. For hardware implementation, processing units may be implemented in one or more application specific integrated circuits (ASIC), digital signal processors (DSP), DSP devices (DSPD), programmable logic devices (PLD), field programmable gate arrays (FPGA), general purpose processors, controllers, microcontrollers, microprocessors, other electronic units configured to perform the function described in the present disclosure or a combination thereof.

For software implementation, the techniques described in an embodiment of the present disclosure can be implemented by modules (e.g., procedures, functions, etc.) that perform the functions described in an embodiment of the present disclosure. The software code can be stored in the storage and executed by the processor. The storage can be implemented within the processor or external to the processor.

The descriptions above are optional embodiments of the present disclosure, it should be noted that improvements and embellishments may be made by one skilled in the art within the scope of the tenets of the present disclosure, and such improvements and embellishments shall fall within the protection scope of the present disclosure.

What is claimed is:

1. A downlink control channel reception method, applied to a terminal, comprising:
   selecting, in a case that monitoring occasions of search spaces transmitted in different Control Resource Sets (CORESETs) configured with different beam directions collide, a target CORESET from the different CORESETs according to types of the search spaces where the collision occurs, wherein the collision during the monitoring occasions comprises that the monitoring occasions are the same and configured resources of the different CORESETs overlap, or, that a time interval between the monitoring occasions is less than a specified threshold; and detecting and receiving a downlink control channel according to a beam direction of the target CORESET;

wherein, selecting the target CORESET from the different CORESETs according to the types of the search spaces where the collision occurs comprises:

selecting, in a case that at least two of the search spaces where the collision occurs are common search spaces, a CORESET with a lowest index as the target CORESET from at least two CORESETs for transmitting the common search spaces;

or, selecting the target CORESET from the different CORESETs according to the types of the search spaces where the collision occurs comprises:

selecting, in a case that the search spaces where the collision occurs are all UE-specific search spaces, a CORESET with a lowest index as the target CORESET from the different CORESETs.

2. The downlink control channel reception method according to claim 1, wherein, selecting the target CORESET from the different CORESETs according to the types of the search spaces where the collision occurs comprises:

determining, in a case that only one of the search spaces where the collision occurs is a common search space, a CORESET for transmitting the common search space as the target CORESET.

3. The downlink control channel reception method according to claim 1, wherein, detecting and receiving the downlink control channel according to the beam direction of the target CORESET comprises:

detecting and receiving the downlink control channel in the different CORESETs according to the beam direction of the target CORESET; or, detecting and receiving the downlink control channel only in the target CORESET according to the beam direction of the target CORESET, and not detecting the downlink control channel in a CORESET other than the target CORESET among the different CORESETs.

4. A downlink control channel transmission method, applied to a network side device, comprising:

in a case that occasions of transmissions of a downlink control channel that requires to be performed in different CORESETs configured with different beam directions collide, wherein the collision during the occasions of the transmissions of the downlink control channel comprises: that the occasions of the transmissions of the downlink control channel are the same and configured resources of the different CORESETs overlap, or, that a time interval between the transmissions of the downlink control channel is less than a specified threshold, selecting a target CORESET from the different CORESETs according to types of search spaces in the different CORESETs where the collision occurs, and transmitting the downlink control channel according to a beam direction of the target CORESET; or, transmitting the downlink control channel in the different CORESETs according to respective beam directions of the different CORESETs;

wherein, selecting the target CORESET from the different CORESETs according to the types of the search spaces in the different CORESETs where the collision occurs comprises:

selecting, in a case that at least two of the search spaces where the collision occurs are common search spaces, a CORESET with a lowest index as the target CORESET from at least two CORESETs for transmitting the common search spaces;

or, selecting the target CORESET from the different CORESETs according to the types of the search spaces in the different CORESETs where the collision occurs comprises:

selecting, in a case that the search spaces where the collision occurs are all UE-specific search spaces, a CORESET with a lowest index as the target CORESET from the different CORESETs.

5. The downlink control channel transmission method according to claim 4, wherein, selecting the target CORESET from the different CORESETs according to the types of the search spaces in the different CORESETs where the collision occurs comprises:

determining, in a case that only one of the search spaces where the collision occurs is a common search space, a CORESET for transmitting the common search space as the target CORESET.

6. The downlink control channel transmission method according to claim 4, wherein, transmitting the downlink control channel according to the beam direction of the target CORESET comprises:

transmitting the downlink control channel in the different CORESETs according to the beam direction of the target CORESET; or, transmitting the downlink control channel only in the target CORESET according to the beam direction of the target CORESET, and not transmitting the downlink control channel in a CORESET other than the target CORESET among the different CORESETs.

7. A network side device, configured to perform the downlink control channel transmission method according to claim 6, comprising a transceiver, a storage, a processor and a computer program stored in the storage and executable by the processor; wherein, the processor is configured to, in a case that the occasions of transmissions of the downlink control channel that requires to be performed in different CORESETs configured with different beam directions collide, select the target CORESET from the different CORESETs according to the types of the search spaces in the different CORESETs where the collision occurs; the transceiver is configured to transmit the downlink control channel according to the beam direction of the target CORESET; or, the transceiver is configured to transmit the downlink control channel in the different CORESETs according to respective beam directions of the different CORESETs;

wherein the collision during the occasions of the transmissions of the downlink control channel comprises: that the occasions of the transmissions of the downlink control channel are the same and the configured resources of the different CORESETs overlap, or, that the time interval between the transmissions of the downlink control channel is less than the specified threshold;

wherein the processor is configured to select, in a case that at least two of the search spaces where the collision occurs are common search spaces, a CORESET with a lowest index as the target CORESET from at least two CORESETs for transmitting the common search spaces;

or the processor is configured to select, in a case that the search spaces where the collision occurs are all UE-specific search spaces, a CORESET with a lowest index as the target CORESET from the different CORESETs.

8. The network side device according to claim 7, wherein the processor is configured to determine, in a case that only one of the search spaces where the collision occurs is a common search space, a CORESET for transmitting the common search space as the target CORESET.

9. The network side device according to claim 7, wherein the transceiver is configured to transmit the downlink control channel in the different CORESETs according to the beam direction of the target CORESET; or, to transmit the downlink control channel only in the target CORESET according to the beam direction of the target CORESET, and not to transmit the downlink control channel in a CORESET other than the target CORESET among the different CORESETs.

10. A terminal, comprising a transceiver, a storage, a processor and a computer program stored in the storage and executable by the processor, wherein, the processor is configured to select, in a case that monitoring occasions of search spaces transmitted in different Control Resource Sets (CORESETs) configured with different beam directions collide, a target CORESET from the different CORESETs according to types of the search spaces where the collision occurs, wherein the collision during the monitoring occasions comprises that the monitoring occasions are the same and configured resources of the different CORESETs overlap, or, that a time interval between the monitoring occasions is less than a specified threshold; and the transceiver is configured to detect and receive a downlink control channel according to a beam direction of the target CORESET;

wherein the processor is configured to select, in a case that at least two of the search spaces where the collision occurs are common search spaces, a CORESET with a lowest index as the target CORESET from at least two CORESETs for transmitting the common search spaces;

or the processor is configured to select, in a case that the search spaces where the collision occurs are all UE-specific search spaces, a CORESET with a lowest index as the target CORESET from the different CORESETs.

11. The terminal according to claim 10, wherein the processor is configured to determine, in a case that only one of the search spaces where the collision occurs is a common search space, a CORESET for transmitting the common search space as the target CORESET.

12. The terminal according to claim 10, wherein the transceiver is configured to detect and receive the downlink control channel in the different CORESETs according to the beam direction of the target CORESET; or, to detect and receive the downlink control channel only in the target CORESET according to the beam direction of the target CORESET, and not to detect the downlink control channel in a CORESET other than the target CORESET among the different CORESETs.

* * * * *